March 17, 1942.   S. J. A. M. BAGNO   2,276,816
MEASURING APPARATUS
Filed May 27, 1939   5 Sheets-Sheet 1
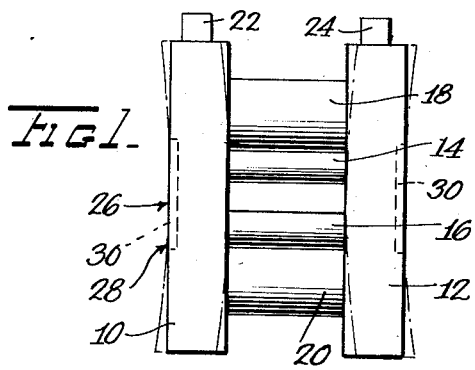
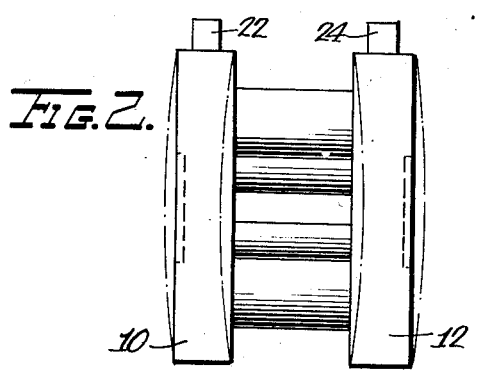
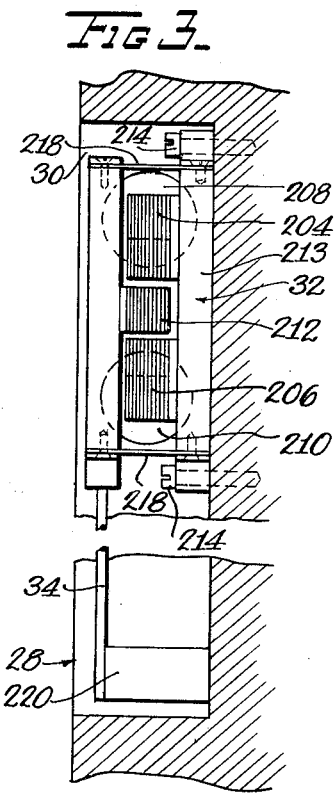
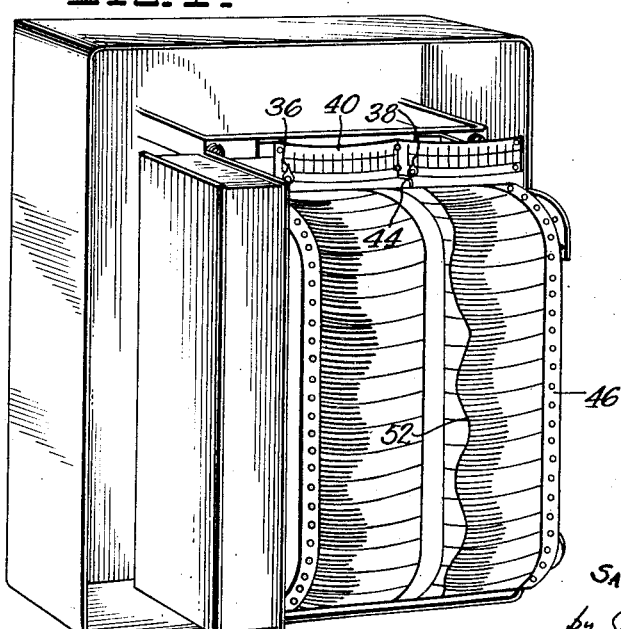
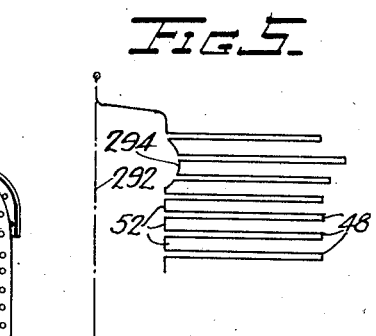
Inventor:
SAMUEL J. A. M. BAGNO
by J. E. Ackman
ATTORNEY March 17, 1942.  S. J. A. M. BAGNO  2,276,816
MEASURING APPARATUS
Filed May 27, 1939  5 Sheets-Sheet 2
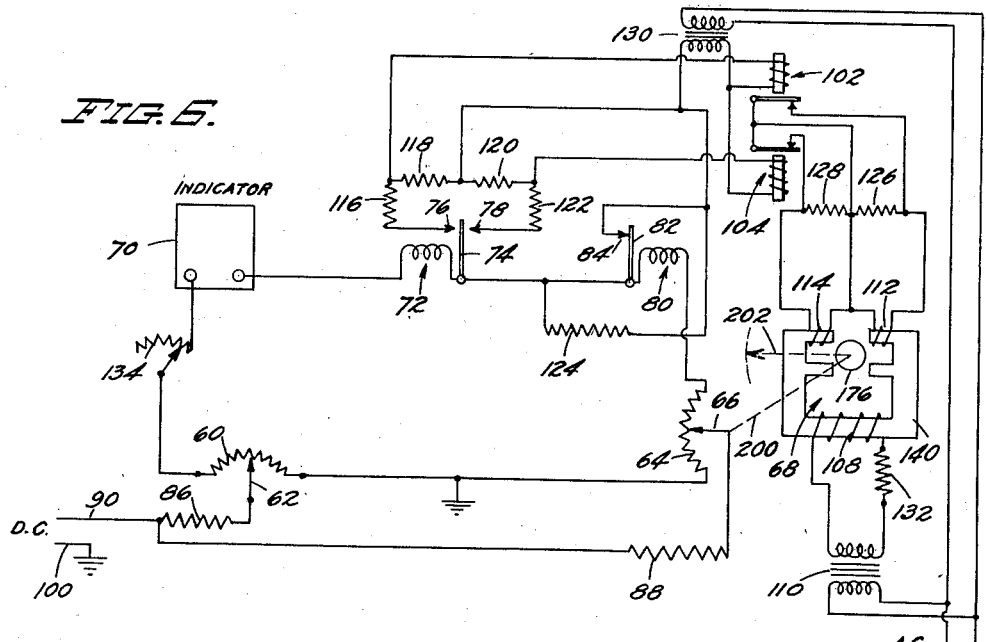
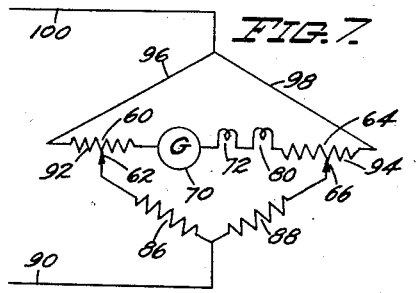
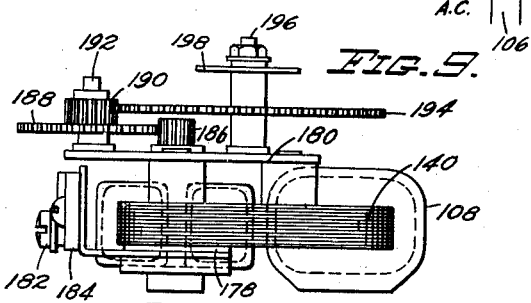
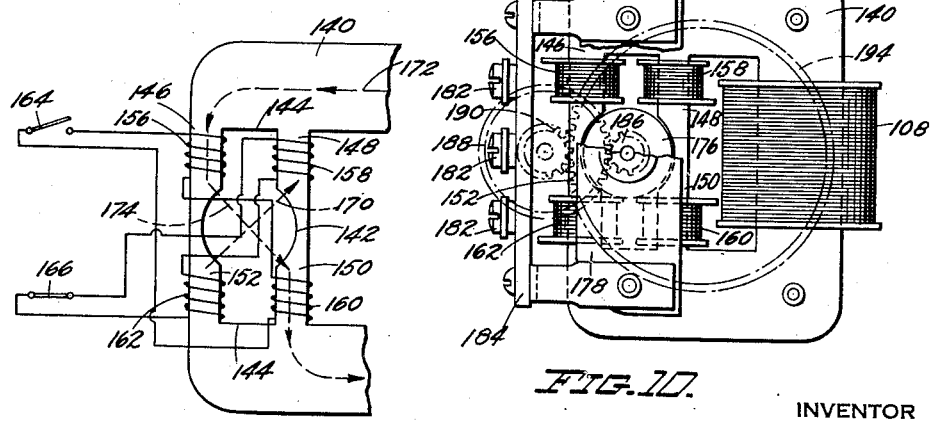
INVENTOR
SAMUEL J. A. M. BAGNO
BY J. E. Dickinson
ATTORNEY INVENTOR
SAMUEL J. A. M. BAGNO
BY J. E. Dickinson
ATTORNEY March 17, 1942.  S. J. A. M. BAGNO  2,276,816
MEASURING APPARATUS
Filed May 27, 1939     5 Sheets-Sheet 4
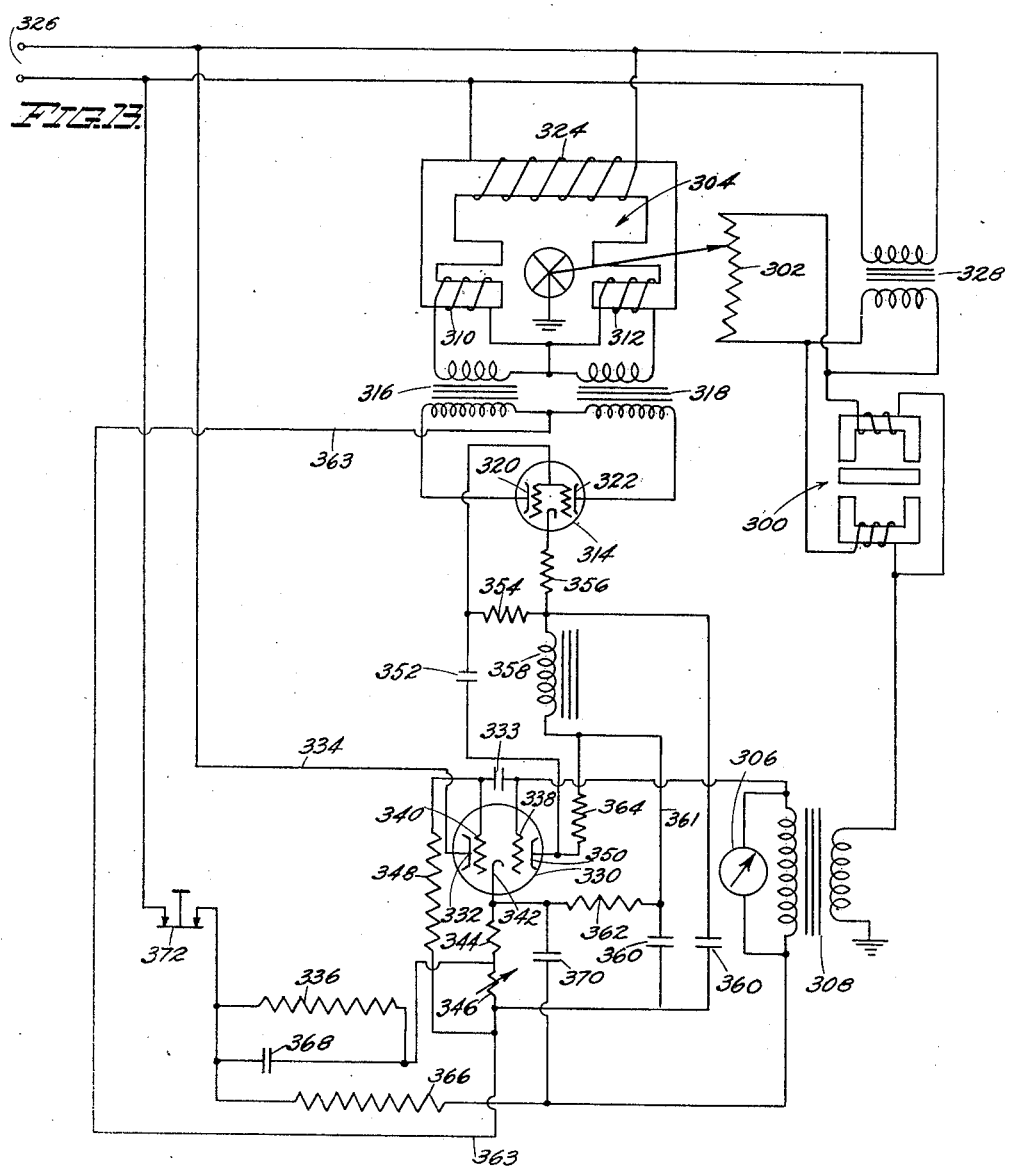
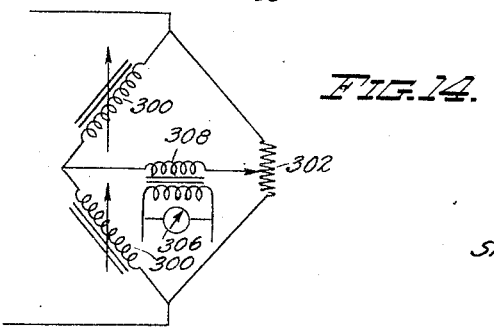
INVENTOR
SAMUEL J.A.M. BAGNO
BY J.E. Dickinson
ATTORNEY

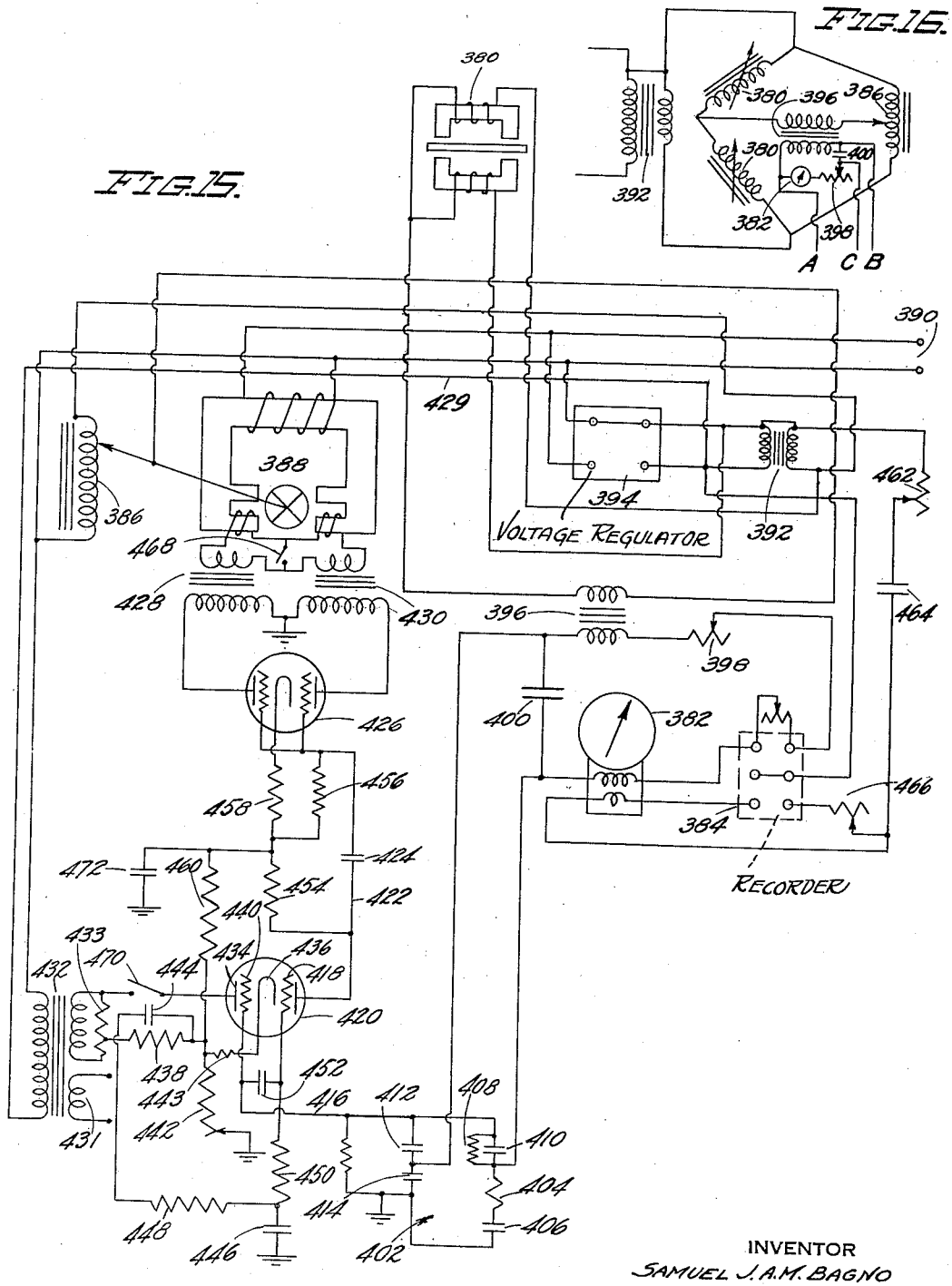

Patented Mar. 17, 1942

2,276,816

UNITED STATES PATENT OFFICE 2,276,816

MEASURING APPARATUS

Samuel J. A. M. Bagno, New York, N. Y., assignor to United Engineering and Foundry Company, Pittsburgh, Pa., a corporation of Pennsylvania Application May 27, 1939, Serial No. 276,117

29 Claims. (Cl. 265—1)

This invention relates to measuring apparatus, and more particularly to such an apparatus arranged to eliminate slow errors when measuring fast changes, this being of especial value in connection with strain gauges for rolling mills.

The primary object of my invention is to generally improve measuring apparatus. A more particular object is to provide a measuring apparatus which will discriminate between a slow or gradual change and a fast or sudden change, so that the apparatus will respond to the latter but not to the former, no matter how large the total change. The invention is of particular value to eliminate error or drift in the zero or base line in apparatus which is used to measure successive or intermittent peak values.

A more specific object of the invention is to generally improve apparatus for measuring the pressure in rolling mills, commonly known as a strain gauge. A long series of large rolling mills is used to rapidly convert white hot ingots to sheet metal. The pressure in the rolling mills is constantly watched and frequently readjusted in order, on the one hand, to maintain adequate working pressure on the metal; and on the other hand, to guard against excessive overload with possible damage to the mill. Elongation of the frame or housing of the mill between fixed points above and below the work is used as a means for operating appropriate measuring devices, this elongation resulting from tension caused by the load spreading the rolls. However, the elongation being measured is very slight, being of the order of only a thousandth of an inch, and serious difficulty arises because of thermal influences which may expand and elongate the frame and so cause a change or error in the strain gauge equalling or even exceeding the real change to be measured. In an effort to obviate thermal influence, the gauge bars are mounted within slots cut in the mill housing and these slots are closed, and may even be filled with oil, in order to keep the gauge bar at the temperature of the housing. This is helpful, but some error remains, because parts of the gauge have a temperature coefficient of expansion very different from the frame, and even the gauge bar may differ somewhat in its coefficient of expansion, and they may not attain the exact mill temperature.

Moreover, I have so far assumed that the temperature of the mill is substantially uniform throughout. Conditions are complicated when there is a substantial temperature gradient across the frame. For instance, when the mill is started up, the heat radiated from the work passing therethrough causes expansion at the inside of the housing, thereby tending to cause warping or so-called buckling of the housing. The outer faces of the mill frames carry the strain gauge, and do not expand as much as the inner faces, or occasionally may even contract, so that the measuring apparatus may even show a negative reading, although usually the expansion effect and positive error predominate. As the mill warms up or becomes "normalized," the reading may gradually drift back toward the value it would have without warping. In the meantime however, the successive pieces of work passing through the mill have caused a series of peak indications which do not correctly indicate the rolling pressure, for each peak starts from an improper base line.

On the other hand, if the supply of work to the mill is temporarily interrupted, the inside faces of the frames may be cooled much more rapidly than the outside faces due to the spray of cooling water commonly applied to the work in order to remove scale. (The work itself is treated so rapidly that it remains hot throughout the rolling process despite the use of a spray of water.) This may tend to cause a warping or buckling of the frame in opposite direction, that is, there may be a contraction at the inside accompanied by a lesser contraction at the outside, resulting sometimes in a further drift of the zero or base line in a positive direction. When the supply of work to the mill is resumed, the peak readings representing the rolling pressure are false because they begin at a substantial value instead of at zero.

Furthermore, the strain gauge cannot be located in the plane of the axes of the rolls, where the housings are open, but instead is located at either the leading or trailing side of the housing. The leading edge may be hotter than the trailing edge, thus tending to subject a gauge at that edge to increased expansion. This is another factor tending to obscure the significance of the actual measurement obtained from the gauge.

These aberrations are large and serious. They often amount to a value corresponding to a quarter or a half of the entire scale of the measuring instrument, and in some rare cases may mount to a value two or three times as great as the entire range of the instrument. The operator controlling the mill pressure must control the front and back frames of each mill, and the speed of each mill to properly compensate for the elongation of the work, and the water spray and other factors, and he ordinarily is in charge of a number of mills in the series, and, therefore, is far too busy to attempt to allow for the zero error while watching the indicators, even if it were possible to thus mentally subtract the difference between the top and bottom readings during the rapid operation of the instruments.

One primary object of my invention is to overcome the foregoing difficulties, and to provide apparatus for continuously compensating the drift of the zero or base line, so that the indicator (or/and recorder) will properly indicate the peaks which represent the rolling pressure. For this purpose advantage is taken of the fact that the error or drift, although it may become large, is always a slow change, whereas the strain caused by a piece of work reaching the mill is a sudden change, and the apparatus differentiates between slow and fast changes. It may be said that the apparatus discriminates between a small change and a large change, the small change being promptly neutralized or obliterated, whereas the large change is not. The effective range or "capture zone" in which the compensating means takes affect may be a matter of, say, 2% (one scale division) in ordinary rolling mill practice, but may be reduced to a very minute amount if desired. Although the total drift may become very large indeed, the increment of change at any one time is small, and the apparatus continuously compensates for these successive small changes. It is for this reason that I prefer to define the apparatus as discriminating between slow and fast changes.

It is important to note that the problem here involved is not merely one of correcting or leveling an average value, and it is not one in which the average of the successive peaks may be treated as a slow drift or error. Instead the compensation must be a true zero compensation and should be completely divorced from the peak values. Accordingly, a further object of my invention is to so design the apparatus that it will not average the peaks or be in any way influenced by the magnitudes of the peak values. For this purpose the compensating mechanism is paralyzed or made inoperative each time a peak comes on, so that the compensating mechanism functions only during the intervals between the successive peaks. In this way the compensation is limited to correction of the zero or base line, and there is no attempt by the apparatus to neutralize the effect of a legitimate elongation of the mill housing caused by the passage of work therethrough.

Further objects of my invention are to adapt the measuring apparatus to utilize any conventional form of magnetic micrometer for measuring the housing strain; to include the measuring and compensating devices in an electrical bridge circuit which is automatically balanced at zero pressure; and to thereby make the apparatus independent of changes in line voltage or like external influences.

To the accomplishment of the foregoing, and additional more particularized objects which will hereinafter appear, my invention consists in the measuring indicating, and compensating elements and their relation one to the other, as hereinafter more particularly described in the specification and sought to be defined in the claims. The specification is accompanied by drawings, in which:

Fig. 1 is a schematic diagram explanatory of warping of a mill when heating up;

Fig. 2 is a similar diagram explanatory of the opposite warping of a mill when cooling;

Fig. 3 is a section through a mill housing and illustrates the mounting of a magnetic micrometer;

Fig. 4 is a perspective view of a combined indicator and recorder with contrasting records with and without zero compensation;

Fig. 5 is a detail of a curve when recording so-called "screw-down pressure" in the end mills;

Fig. 6 is a wiring diagram for one embodiment of my invention utilizing a direct current bridge and polarized relays of differing sensitivity;

Fig. 7 is a rearrangement of part of Fig. 6 in bridge form;

Fig. 8 is explanatory of a shaded pole reversible induction motor which may be used in the compensating mechanism;

Fig. 9 is a plan view illustrating the construction of the motor;

Fig. 10 is a side elevation of the same;

Fig. 13 is a wiring diagram for still another form of my invention utilizing an alternating current bridge and electron emission relays;

Fig. 14 is a rearrangement of a part of Fig. 13 in bridge form;

Fig. 15 illustrates a modification; and

Fig. 16 shows a part of the same in bridge form.

Figure 11:
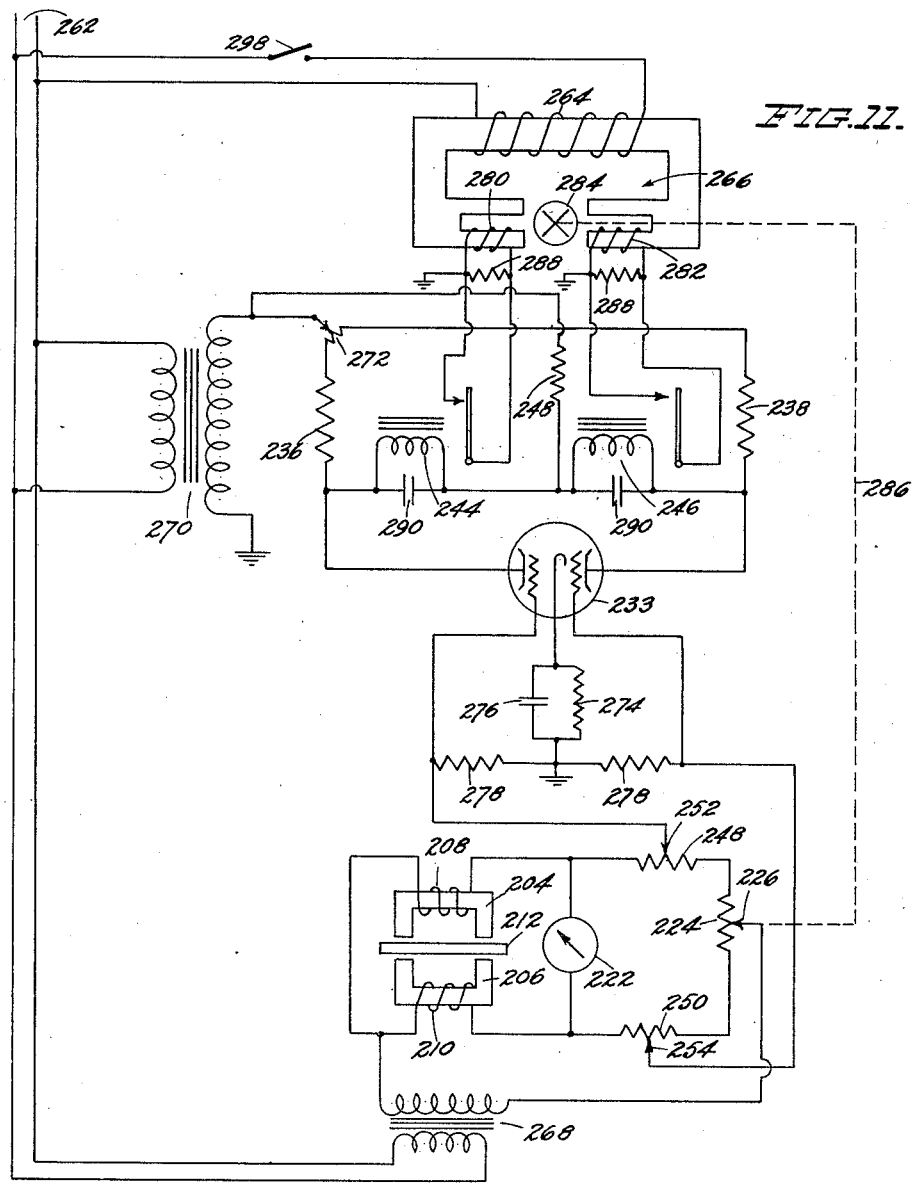
Fig. 11 is a wiring diagram for another embodiment of my invention utilizing an alternating current bridge and non-polarized relays.

Referring to the drawings, and more particularly to Fig. 1, the rolling mill, which is only schematically illustrated, comprises spaced housings or frames 10 and 12 carrying working rolls 14 and 16 and additional backing rolls 18 and 20. The spacing between upper and lower rolls 14 and 16 may be regulated by means of appropriate adjusting screws which are preferably driven under remote control by suitable electric motors. This adjusting mechanism is schematically indicated by the rectangles 22 and 24. It will be understood that there is a long series of mills with progressively diminishing spacing between the rolls and progressively increased rotative speed, so that an ingot of steel in white hot condition may be started at one end of the series and be reduced to sheet metal at the other end. The mills may be very large, as when designed to handle ingots five feet square in section, and in such case the working rolls 14 and 16 may have a diameter of, say, 18 inches, the backing rolls 18 and 20 a diameter of five feet, and the rolling stress to be withstood by frames 10 and 12 may be a matter of several million pounds.

This stress is measured by measuring the elongation or strain of the housing between spaced points, such as the points 26 and 28. This distance thas been greatly exaggerated in the drawings, and in practice may be a matter of only a few feet. The frame is slotted or cut out, as is indicated at 30, to receive and protectively enclose the instrument which measures the strain or elongation between the points 26 and 28. The instrument itself may be mounted at either point, say, the upper point 26 and the movable portion thereof may be connected by a gauge bar to the lower point 28. Thus, in Fig. 3, the instrument generally designated 32 is fixedly mounted at the upper end 26 of slot 30, while the movable element of the instrument is connected to the lower point 28 of slot 30 by means of a suitable connecting link or gauge bar 34. The main reason for housing the mechanism in slot 30 is to maintain the same, and particularly the gauge bar 34, at the temperature of the mill housing, so that expansion, due to temperature change, will affect gauge bar 34 along with the frame, thus minimizing error from this source. It will be understood that in practice the slot 30 is closed by a suitable cover plate, and in fact may even be filled with oil and sealed.

Despite the foregoing precautions, serious errors are found. One is due to thermal expansion of the parts of the gauge, as for example, the part 216 which is made of brass. Even gauge bar 34 cannot be selected to have exactly the same expansion as the housing. Another error is that caused by large differences in temperature at the inside and outside of the housings. For example, when starting up the mill the heat radiated from the work expands the inner sides of the housings, thus tending to change the same from the solid line position to the broken line position of Fig. 1. This may even be accompanied by a relative or apparent contraction at the outer sides of the housings, resulting in a false indication equivalent to negative pressure. The change shown in the drawing is, of course, exaggerated, but very little movement is needed to produce a serious error, for the entire range of elongation produced by passage of work through the mill may be a matter of only a thousandth of an inch. Then as the mill becomes normalized the outside as well as the inside expands, and the error may become positive, as when the housing near the gauge expands more than the gauge. Sometimes this expansion error is felt immediately and exceeds the warping error, in which case the error may never be negative, but will be positive from the beginning.

The mill is commonly sprayed with water intended to help remove scale from the work passing therethrough. If the supply of work to the mill is temporarily interrupted, this spray of water causes a much more rapid cooling at the inside than at the outside of the mill, and the frames or housings tend to warp or buckle in opposite direction, as is indicated in broken lines in Fig. 2. The contraction at the inner faces of housings 10 and 12 while the outer faces remain expanded, produces a false elongation or measurement equivalent to positive pressure.

In practice, the situation is further complicated by the complex configuration of the mill housings, and by numerous other factors and variables of generally unpredictable and uncontrollable natures.

The rolling pressure may be indicated on a suitable indicating instrument, or may be recorded, and ordinarily is both indicated and recorded. An instrument for this purpose is illustrated in Fig. 4 and comprises pointers 36 and 38 cooperating with scales 40 and 42. The pointers also move suitable recording pens, such as that indicated at 44. The recording pens trace a double record on a travelling sheet 46. The instrument is arranged in duplicate because it is common practice to separately measure the strain at both the front housing 10 and the back housing 12.

In Fig. 4 the scale of the drawing is too small to clearly show the nature of the curve being traced, but this will be clear on reference to Fig. 5, in which it will be seen that the curve consists of a series of peaks 48 extending to the right of a base line 50. The lower line of each peak corresponds to the forward end of a piece of work hitting the mill, while the upper line of each peak corresponds to the trailing end of the piece of work leaving the mill. The right hand ends of the peaks represent the passage of the work through the mill, while the sections of base line 50 between the peaks correspond to the intervals between the passage of successive pieces through the mill.

The right hand curve of Fig. 4 illustrates the kind of curve which may be obtained when not using the present invention while the left hand curve illustrates the result obtained when using the invention. In the right hand curve, it will be observed that the base line 52 drifts from side to side in an erratic manner. The curve is one taken in the course of actual operation, and is not nearly as bad as that sometimes obtained, as when the base line crosses zero, or, being prevented from so doing by the mechanical limit of pen 44, is even more deceptive in producing very small peaks. It is evident that to readily and correctly read the rolling pressure, the base line 52 should be maintained at a fixed and preferably zero value.

One apparatus for this purpose may be described with reference to Fig. 6 of the drawings. The apparatus comprises a direct current bridge including a potentiometer resistor 60 acting as a measuring device and varied by suitable mechanical means, such as a motion multiplying micrometer gauge, the moving arm of which is used to move the slidable contact 62. The bridge further comprises a compensating potentiometer 64, the contact 66 of which is moved by means of a suitable reversing motor generally designated 68. An indicator 70 is connected across the bridge and responds to unbalance of the bridge as a measure of the change at potentiometer 60. It will be understood that the instrument 70 may be a recorder or a combined indicator and recorder. Hereafter for simplicity, I shall refer to the instrument as an indicator (because the recorder also indicates), and I intend to include either type of instrument.

A relay 72 is connected in series with indicator 70. This relay is preferably a sensitive polarized relay, and its armature 74 cooperates with opposed spaced contacts 76 and 78. The relay contacts are arranged to control reversible motor 68, and the motor is started in that direction which so changes the compensating resistor 64 as to balance the bridge. This prevents response at the indicator 70, thus maintaining the desired zero or base line.

A second relay 80 is connected in series with relay 72. The armature 82 normally engages contact 84 and these are arranged in series with armature 74 of relay 72. Relay 80 is made less sensitive than relay 72, and it does not respond to small changes of the measuring resistance 60. These small changes do influence relay 72, and such changes are, therefore, neutralized by resulting changes in the compensating resistance 64. Of course, the total change may be very large, but if the change is slow it is continuously corrected by the compensating resistance, and, therefore, at any one time remains small. A large sudden change, however, operates relay 80 and thereby makes relay 72 inoperative to start the compensating motor 68. Thus, during peaks when work is passing through the mill, the entire compensating mechanism is paralyzed or made inoperative and the true value of the peak is indicated by instrument 70. After the work has passed through the mill the relay 80 returns to normal position and the control relay 72 is again made effective to control motor 68. The measuring unit 60 and compensator unit 64 are connected into a bridge which is completed by fixed resistors 86 and 88. The arrangement of the bridge will be clear from inspection of Fig. 7 showing how fixed resistors 86 and 88 constitute two arms of a bridge and are connected in common to one side of a direct current power supply by means of conductor 90. The other two arms of the bridge include the outer end portions 92 and 94 of the potentiometers 60 and 64, that is, they comprise the resistance lying outside of the contacts 62 and 66. The resistance portions 92 and 94 are connected in common by conductors 96 and 98 to a lead 100 leading to the opposite side of the power supply. The instrument 70 is of the galvanometer type and is connected across the bridge. The sensitive relay 72 and the somewhat less sensitive relay 80 are connected in series with instrument 70 and are similarly subjected to a current resulting from unbalance of the bridge.

With the bridge balanced, current flows from lead 100 equally through both sides of the bridge to lead 90. On one side the current flows through conductor 96, resistance portion 92 and resistor 86. On the other side the current flows through conductor 98, resistance portion 94 and resistor 88. The potential at contact 62 equals that at contact 66, and there is no potential difference across instrument 70. If now the contact 62 is moved, say, to the left, it is changed in potential and current will flow through instrument 70 in one direction, whereas if contact 62 is moved toward the right, it will be oppositely changed in potential and current will flow through instrument 70 in opposite direction. Of course, if compensating contact 66 is moved to compensate for the change in contact 62, then the bridge is again balanced and the desired zero reading for instrument 70 may be maintained.

Before leaving Fig. 7, it may be pointed out that the fixed resistors 86 and 88 are preferably made very large compared to the variable resistors, or in this case the potentiometers, because the fixed resistors then have only negligible shunting effect on the instrument 70. Moreover, if the resistors 86 and 88 are large the current flowing through the bridge tends to remain constant. This makes the voltage change in linear relation to the resistance, and a linear voltage change applied on opposite sides of a substantially constant impedance (instrument 70) produces changes in current through the instrument which are linear. Consequently, the use of large values for resistors 86 and 88 produces linear response in instrument 70, and also makes it possible to adjust the relays 72 and 80 in accordance with linear current values. The relays 72 and 80 are preferably meter relays, thereby providing the necessary sensitivity and at the same time making it possible to establish the values at which the relays operate with great precision. Of course, a relay of this character is not desirable for direct control of the motor, and I therefore prefer to use secondary relays 102 and 104. Such secondary relays may be wired to control Such secondary relays may be wired to control the supply of energy from a power source to a reversing motor. This supply of energy may, if desired, be taken from an alternating current line as is indicated at 106, in case it is not desired to use power from the direct current supply. In the present case, the motor 68 happens to be a shaded pole reversible induction motor, the field 108 of which is continuously connected to the alternating current line 106, as by means of transformer 110. The relay contacts are wired to control the shading coils 112 and 114, rather than the main power supply. The manner in which this is done will be described in greater detail with reference to Fig. 8, but before leaving Fig. 6 it may be briefly mentioned that a number of resistors may be added to protect the relay contacts. Resistors 116, 118, 120 and 122 are adedd for relay 72, resistor 124 for relay 80, resistor 126 for relay 102 and resistor 128 for relay 104. The power for energizing the coils of relays 102 and 104 is taken from A. C. line 106, as by means of the transformer 130. A resistor 132 may be connected in series with motor field coil 108 in order to protect the same by limiting the current flow therethrough. A variable resistance 134 is shown connected in series with the indicator 70 and is intended merely to control the sensitivity of the instrument.

Referring now to Fig. 8 the core 140 of the motor is preferably a continuous or closed core. One leg is partially cut away at 142 to receive the rotor. This leg is slotted on opposite sides of the rotor, as is indicated at 144, thereby providing shading poles 146, 148, 150 and 152. These carry shading coils 156, 158, 160 and 162. Diagonally opposite coils 156 and 160 are connected in series with one another and the circuit therethrough may be closed or made conductive by a suitable device here indicated as a switch 164. Coils 158 and 162 are similarly connected in series with one another and may be short-circuited or made conductive by switch 166. These switches are closed in the alternative, and in Fig. 8 the switch 164 is shown open while the switch 166 is shown closed. The shading coils act as the secondaries of a transformer, the primary of which is the main field coil 108 (Fig. 6) of the motor. Coils 158 and 162 being short-circuited, they generate a flux indicated by the dotted arrow 170 which is in opposition to the main field flux 172. The latter, therefore, follows a diagonal path through poles 146 and 150, as is indicated by the dotted arrow 174.

The current induced in the short-circuited shading coils is out of phase with the magnetizing current in the main field coil 108, and the shading coil flux indicated by the arrow 170 is out of phase with the main field flux 174, thus producing a rotating field which causes self-starting of the rotor.

At this time, the motor may be treated as though shading coils 158 and 162 are the only shading coils, for the coils 156 and 160 being open circuited are ineffective and may be treated as non-existent. The reason for providing coils 156 and 160 together with the control switch 164 is to produce rotation of the motor in opposite direction. In other words, with switch 166 closed the motor will start in one direction, whereas with switch 164 closed the motor will start in opposite direction.

Reverting now to Fig. 6 the field core 140 has been drawn in a simplified or schematic fashion and each of the series connected pairs of diagonally opposite shading coils, is more conveniently represented by the single shading coils 112 and 114. The switch action for short-circuiting one coil or the other is, of course, obtained by means of the contacts of relays 102 and 104.

The contacts may be normally open, and one contact or the other then be closed to start the motor, or as here indicated the contacts may be normally closed, for in such case the motor is unable to start. However, upon opening of one of the closed contacts, the other shading coil is made effective to start the motor.

The structure of the induction motor is illustrated in Figs. 9 and 10, referring to which the field core 140 has a field coil 108 wound about one leg, while the rotor 176 is received in an opening cut through the opposite leg. This leg is divided or slotted to form the four poles 146, 148, 150 and 152, previously referred to, around which are placed the shading coils 156, 158, 160 and 162.

As a refinement, the rotor 176 may be made of a non-magnetic material, so that there will be no operating torque as a single phase motor, the flux being shunted around opposite sides of the rotor through the continuous core. This refinement is not necessary for successful operation. The rotor shaft is carried on bearings which are preferably formed in non-magnetic plates such as the brass plate 178 on one side, and the brass plate 180 on the opposite side. Connections to the shading coils may be made at the screws 182 mounted on insulation strip 184. There are only three connection screws because the adjacent sides of the shading coils may be connected in common.

The motor may be, and preferably is provided with a high ratio reduction gear train, thus adding greatly to the torque applied to the potentiometer contact arm and making possible greater precision in operation. Specifically, the rotor shaft carries a pinion 186 meshing with a gear 188 secured to a pinion 190 and rotating freely about a fixed pin 192 projecting outwardly from plate 180. Pinion 190 meshes with a large diameter gear 194 rotating on a pin 196 secured to plate 180. The potentiometer arm, a fragment of which is indicated at 198, is secured to and rotates with gear 194.

Reverting to Fig. 6 the driving connection between rotor 176 and potentiometer contact 66 is schematically indicated by the broken line 200. If desired, a pointer or indicator 202 may be moved together with contact 66, this indicator then acting to show the presence and direction of warping of the mill housing, or other error producing factors.

Some quantitative circuit values used in a specific case may be of interest. A direct potential of 180 volts was used across the conductors 98, 100. The fixed resistor 86 was 2,000 ohms, fixed resistor 88 was 10,000 ohms, measuring potentiometer 60 was 300 ohms, compensating potentiometer 64 was 200 ohms (it covering a part only of the range), sensitivity controlling resistor 134 was 2,000 ohms maximum, the protective resistors 116, 122 and 124 were 500 ohms, protective resistors 118 and 120 were 750 ohms, protective resistors 126 and 128 were 1500 ohms, and current limiting resistor 132 was 800 ohms. The alternating current line voltage was 220 volts. The induction motor was designed for 110 volts, and this was taken care of by transformer 110. The secondary voltage from the transformer 130 for use in secondary relays 102 and 104 was 7.5 volts. The relay 72 was a Weston No. 634 SPDT relay, and relay 80 was a Weston No. 634 SPST relay. It will be understood that the foregoing quantitative values are given merely by way of exemplification and not in limitation of the invention.

The operation of the circuit of Fig. 6 may be summarized as follows:

The measuring and compensating resistors are connected in a bridge circuit, and indicator 70 is connected across the bridge. The bridge is normally balanced when no ingot is passing through the mill. When an ingot hits the mill the contact 62 is suddenly moved a substantial amount and the indicator 70 is deflected proportionately. When the ingot passes the mill the instrument returns to zero. As the heat of passing ingots is applied to the inside of the mill housing the mill buckles at the outside and moves measuring contact 62 in negative direction. Instrument 70 might tend to read negatively, or may be mechanically prevented from doing so depending on the design of the instrument. The negative movement of contact 62 causes a negative current flow which closes relay 72, say, toward the left, and which is not large enough to affect or open relay 80. Relay 72, therefore, opens the contents of secondary relay 102, thus open-circuiting shade coil 112 and making shade coil 114 effective to start motor 68. The direction of the motor is such as to change compensating contact 66 in that direction which brings the bridge back to balance. There is accordingly no reading at indicator 70, and the desired zero reference value is maintained.

During this time the ingots pass successively through the mill. Each time an ingot hits the mill there is a sudden unbalance of the bridge which not only produces a reading at indicator 70, but which instantly opens the contact of relay 80, thus destroying the alternating current circuit between relay 72 and the secondary relays. Armature 74 of relay 72 moves to the right and engages contact 78, but is ineffective to energize secondary relay 104 because of the movement of armature 82 away from contact 84. The shading coils 112 and 114 of motor 68 remain short-circuited and the motor does not start.

If now the supply of ingots to the mill is stopped for some reason, the inside of the mill is cooled by the water spray, and contracts, thereby elongating the outside of the mill. This moves the measuring contact 62 in positive direction and so unbalances the bridge that relay armature 74 moves to the right and energizes secondary relay 104, thereby opening the circuit of shading coil 114, whereupon shading coil 112 becomes effective to start motor 68 in proper direction to again balance the bridge. There is accordingly no reading at indicator 70, and a true zero reference point is maintained. The relay 80 is not operated because the change in the measuring resistance is small or slow. I do not mean that the over-all change is small, because it may become great, but because the change is slow the increments of change are small and the effective change is kept small by the follow up action of motor 68 on the compensating resistor of the bridge.

Figure 12:
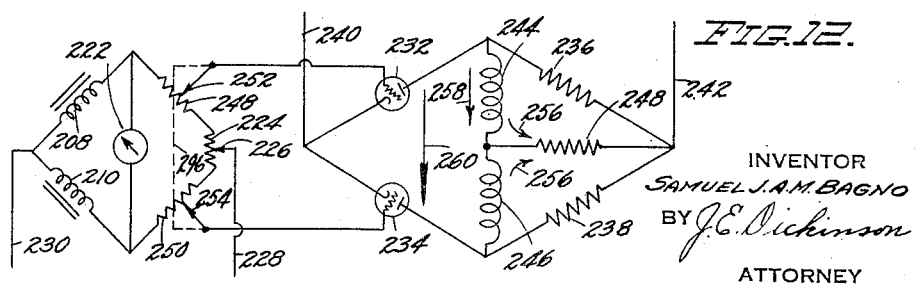
Fig. 12 is a rearrangement of part of Fig. 11 in bridge form.

A very different circuit arrangement is shown in Figs. 11 and 12. This arrangement is intended for complete alternating current operation from an ordinary 110 volt 60 cycle lighting circuit. It employs relays, but the relays are identical non-polarized relays which discriminate because of the manner in which they are connected in circuit, rather than because of any difference in sensitivity. The follow up motor for balancing the bridge is an induction motor like that previously described, but the measuring impedance which is varied by elongation of the mill housing is entirely different in character.

The instrument in question is commonly known as a magnetic micrometer and referring to Fig. 11, this device comprises an upper U-shaped core 204 and a lower U-shaped core 206 provided with identical coils 208 and 210. An armature 212 is disposed in the air gap between cores 204 and 206 and normally occupies a mid-position therebetween. Movement of the armature upwardly increases the impedance of coil 208 and decreases the impedance of coil 210, and the converse applies to downward movement of the armature. The coils 208 and 210 may be connected in the arms of a bridge circuit, as is indicated at the left of Fig. 12, so that movement of the armature unbalances the bridge.

The construction of the magnetic micrometer may be explained further by reverting to Fig. 3 of the drawing which shows how the magnetic micrometer, generally designated 32, is mounted in slot 30. The cores 204 and 206, together with their coils 208 and 210, are secured in fixed relation to a heavy brass base 213 which is fixedly mounted in slot 30, as by means of screws 214. The armature 212 is carried by a heavy brass member 216 and is kept in parallel relation to base 213, as by means of leaf spring members 218. The air gap between armature 212 and cores 204 and 206 has been greatly exaggerated in the drawing for the sake of clarity, and in practice it may be very small indeed, because the motion dealt with is only micrometric. The armature 212 and plate 216 are moved by means of gauge bar 34 which may be several feet in length, and which is rigidly connected to the mill housing at its lower end, as by means of a block 220.

Referring now to Fig. 12, the magnetic micrometer is connected into a first bridge circuit, as is indicated at 208, 210. An unbalance of the bridge produces a reading at indicator 222. The bridge may be kept in balance by means of a compensating impedance 224 which is connected into two arms of the bridge in potentiometer fashion. The movable contact 226 of the compensating impedance is connected to one side of an alternating current line, as by means of the conductor 228, while the common terminal of the magnetic micrometer is connected to the other side of the alternating current line, as by means of the conductor 230.

The unbalance of the bridge is used to control relays which in turn control the motor. It is convenient to connect the relays in a separate or second bridge circuit, and to control the second bridge from the first bridge through vacuum tubes. In Fig. 12 the second bridge has tubes 232 and 234 connected in two arms thereof. The bridge is completed by fixed resistors 236 and 238. The bridge is energized from an alternating current source through conductors 240 and 242. This may be the same alternating current source as is used for the first bridge. The coils of the relays are indicated at 244 and 246, and it will be seen that these coils are connected in series across the bridge, and that their common terminal is connected to one end of the bridge through a suitable impedance 248.

It will be evident that if tubes 232 and 234 are equally conductive, the bridge is balanced, and conversely if they are unequally conductive, the bridge is unbalanced. The conductivity or impedance of the tubes is controlled through their grids which in turn are suitably connected to and are influenced by the first bridge. The grids might, for example, be connected to the top and bottom corners of the first bridge, and will then experience the same potential change that is applied to the indicator 222. However, it is more convenient to be able to select a desired grid potential, and for this reason and another which is explained later, the arms of the first bridge are provided with fixed resistors 248 and 250. These are tapped by contacts 252 and 254, contact 252 leading to the grid of tube 232 and contact 254 leading to the grid of tube 234. The arrangement is such that the second bridge is balanced when the first bridge is balanced, but when the first bridge is unbalanced, the second bridge is similarly unbalanced. For example, if movement of the magnetic micrometer decreases impedance 208 and increases impedance 210, the current flow through the upper arms of the bridge is much greater than that through the lower arms of the bridge, and the potential at contact 252 is dropped compared to that at 254. This makes the tube 232 less conductive and tube 234 more conductive. Hence, greater current flows through the lower arms of the bridge.

When the second bridge is balanced the relays 244 and 246 experience a comparatively small normal current flow, the current flowing in opposite directions through the relays, as is indicated by the arrows 256. This flow of current is adequate to keep the relay contacts closed. If the bridge is unbalanced somewhat, there is a tendency for current to flow across the bridge, and the current through one relay may be increased, as is indicated by the arrow 258, while the other relay is de-energized because the unbalance current bucks and neutralizes the normal current. Thus, one relay remains closed while the other opens. If, however, the bridge is suddenly unbalanced by a large amount, the unbalance current flowing across the bridge and represented by the arrow 260 becomes very large and re-energizes relay 246, so that both relays are closed. Thus, although the relays are identical, they are so connected into the second bridge that they discriminate between small or slow unbalance and large or sudden unbalance.

With the foregoing explanation in mind, it is believed that no difficulty will be experience in understanding the complete circuit shown in Fig. 11. The alternating current supply is indicated at 262. This is used to energize the field coil 264 of reversible induction motor 266. It also energizes the first bridge through a transformer 268, and energizes the second bridge through a transformer 270. The first bridge is located at the bottom of the diagram and comprises the magnetic micrometer, the compensating resistance 224, the indicator 222 and the fixed tapped resistors 248 and 250. The contacts 252 and 254 lead to the control electrodes or grids of tube 233 which is really a double tube containing the electrodes for the two tubes 232 and 234 indicated in Fig. 12. The second bridge comprises the cathode to anode circuits of tube 233 for two arms, and the fixed resistors 236 and 238 for the other two arms. Relays 244 and 246 are connected in series with one another and across the bridge. Their common terminal is connected to one side of the bridge through a fixed impedance 248. A potentiometer 272 may be provided at one corner of the bridge in order to balance for possible inequality in the tube impedances of the two halves of tube 233. A bias potential for the tubes is provided by resistor 274 and shunt condenser 276. Resistors 278 are grid resistors which tie the grids to ground in respect to the steady or bias potential.

The reversible induction motor 266 may be exactly like that previously described. Shading coil 280 is controlled by relay 244, and shading coil 282 is controlled by relay 246. When the bridge is balanced, both relays are closed and the motor is inoperative. If the bridge is unbalanced by small amount, one relay opens and the motor starts. It is started in that direction which varies the compensating impedance 224 in proper direction to again balance the bridge. The gearing between the rotor 284 of the motor and the contact 226 may be of any desired character, and is symbolically represented by the broken line connection 286. If the bridge is abruptly unbalanced by a large amount, both relays are held closed by the unbalance current, and the motor is inoperative. Thus, compensation takes place only between peaks, and in no way affects the peak readings.

The contacts of relay 244 and 246 may, if desired, be protected by suitable protective resistors 288, and attempted chattering of the relays at the frequency of the power supply may be prevented by suitable shunt or filter condensers 290.

As so far described the invention is used exclusively to maintain a base line or reference line of zero. It may be desired in some cases to maintain a reference line at some other value than zero. For example, at the end of the series of mills where the material being rolled is already in sheet form, the working rolls may run in contact with one another and under substantial pressure even when no material is going through the mill. This initial pressure is commonly called the screw-down pressure. With the invention as so far described the screw-down pressure will not be visually recorded on a chart. However, if the chart is provided with the usual zero reference line, and if the base line about which the apparatus compensates is made equal to the screw-down pressure, then the chart will show the screw-down pressure and the rolling pressure. For example, referring to Fig. 5, the zero reference line on the chart may be the line 292. The base line 50 shows the screw-down pressure, while the peaks show the rolling pressure. If the compensating mechanism is not employed, the base line 50 will be a wavy and unsteady line, as is indicated by the departure 294. If, however, the compensating mechanism is used, then the peaks may be measured in respect to a steady base line, as is indicated at 50.

Returning now to Figs. 11 and 12, this result may be obtained by oppositely equally moving the contacts 252 and 254, because this changes the balance point of the second bridge relative to the first bridge. In other words, the tubes 232 and 234 are unbalanced as far as zero is concerned, but may be balanced in respect to a new compensation point or reference line, and the relays controlling the motor thereafter operate in respect to this new reference line.

The contacts 252 and 254 are, therefore, preferably mechanically connected together for equal movement (although opposite in electrical sense), and such a mechanical connection is schematically indicated in Fig. 12 by the broken line 296. This is desirable in order not to upset the correct relations in the two bridges as theretofore established for zero compensation.

To set up the circuit to show screw-down pressure, it is merely necessary to first open the motor circuit, as by means of switch 298 (Fig. 11), so that the motor is inoperative, and to then apply the desired screw-down pressure. At this time the indicator 222 actually shows the screw-down pressure. The contacts 252 and 254 are then oppositely varied under uni-control until one relay opens and again closes and before the other relay opens. The power supply to the motor is again resumed by closing switch 298, whereupon the apparatus thereafter compensates about the screw-down pressure as a reference point.

As an example of quantitative values which have been used in the circuit of Fig. 11, I may state that in a specific case, the resistors 236, 238 and 248 were each 10,000 ohms; the resistor 272 was 1,000 ohms; the resistors 288 were each 1,000 ohms; the resistors 278 were each one-half megohm; the resistor 274 was 400 ohms; the condenser 276 was a 20-m.m.f. electrolytic condenser; the condensers 290 were 1 microfarad paper condensers, and the potentiometers 226, 248 and 250 were each 400 ohms. The tube 233 was a dual triode No. 6N7. The relays 244 and 246 were Kurman sensitive relays No. 42, having an impedance of 4,000 ohms. The magnetic micrometer was a Westinghouse magnetic micrometer, having an impedance of the order of 500 ohms. The motor 266 was a conventional shaded pole reversible induction motor. The transformer 268 feeding the measuring bridge was a step-down transformer changing the 110-volt supply to thirty volts, while the transformer 270 feeding the relay bridge was a step-up transformer changing the 110-volt supply to 220 volts. It will be understood that these values are given solely by way of example, and not in limitation of the invention.

The operation of the circuit of Figs. 11 and 12 may be reviewed as follows. Any unbalance of the bridge caused by the magnetic micrometer causes a potential to be put on the grids of the vacuum tubes 232 and 234. Since the plates of these tubes are fed by alternating current, the plates conduct current intermittently and simultaneously, both plates working during the positive half of the cycle, but not during the negative half. The potential caused by the unbalance of the magnetic micrometer bridge is so fed to the grids of the vacuum tubes that when one grid is positive the other is negative and, as a result, one tube (that in which plate and grid go positive together) conducts while the other (that in which the plate goes positive when the grid goes negative) is biased almost to cut-off or beyond. This causes an unbalance in the bridge circuit made up of the two tubes and plate resistors 236 and 238. This unbalance causes an unbalance in the current flowing through the relays 244 and 246. These relays normally conduct a slight amount of current, sufficient to hold them closed, and the bridge unbalance has the effect that, whereas the current in one relay increases, the current in the other relay decreases to zero, so that one relay opens. However, if the unbalance is still greater, the current in the latter relay increases again, although in opposite direction. This causes the second relay to close again.

Inasmuch as the contacts of these relays are across the shading coils of the motor 266, the relays will cause the motor to turn by short-circuiting one of the shading coils, if the other coil has a negligible load across it, which is the case when one relay opens. Further unbalance of the magnetic micrometer bridge and, in turn, of the tube bridge, will cause both shading coils to be short-circuited and the motor will stop. With small unbalances, the motor operates the compensating potentiometer 224 in such a way as tends to balance the bridge again. If, however, the change is very sudden and of such magnitude that both relays remain closed, the motor has no tendency to adjust the magnetic micrometer bridge to zero, and the extent of the unbalance is indicated by the meter 222.

It is not essential to use mechanical relays to control the induction motor. The motor may instead be controlled by electron tube relays, and a circuit arrangement for this purpose is shown in Fig. 13. The measuring impedance is a magnetic micrometer generally designated 300. The compensating resistor is shown at 302, and is controlled by induction motor 304. The strain indicator is numbered 306. The manner in which these parts are connected to form a bridge circuit will be clear from Fig. 14, the coils of the magnetic micrometer being disposed in two arms of the bridge, as shown at 300, and the compensating potentiometer being connected in the other two arms, as shown at 302. The instrument 306 is connected across the bridge through a transformer 308. The bridge is energized by alternating current supplied at the top and bottom of the bridge, as shown.

Reverting now to Fig. 13, the shading coils 310 and 312 of motor 304 are controlled by the elements of an electron emission tube 314 which in the present case is a double element tube functioning as two tubes, one for each set of shading coils, and it may be convenient hereinafter for purposes of explanation, to refer to the same as two tubes rather than one.

Inasmuch as the tubes present a high resistance to flow of current, the effective resistance is preferably reduced by connecting the tubes to the shading coils through high ratio transformers 316 and 318. The resistance of the tube when reflected from the secondary to the primary of the transformer appears to the shading coil as the resistance of the tube divided by the square of the turns ratio of the transformer. Thus a tube whose resistance is 10,000 ohms, if reflected through a fifty-to-one ratio transformer, will appear to the shading coil to have a resistance of only four ohms. The use of transformers, therefore, makes the shading coils far more conductive and far more effective.

It will be observed that the anodes or plates 320 and 322 of the tubes are connected to the transformers in phase opposition, so that plate 320 is made positive (by the alternating energy from motor field coil 324) at the same time that plate 322 is made negative, and vice versa. Thus one tube tends to be conductive, and the other non-conductive, by reason of the influence of the plate potential alone. The control electrodes of the tubes are, however, connected together, or in parallel.

The apparatus is energized from a suitable alternating current supply indicated at 326. The current may, for example, be an ordinary 110 volt, 60 cycle lighting current. Field 324 is energized directly from line 326. The bridge circuit is also energized from the same line, as for example, through transformer 328. The unbalance current obtained from the bridge is therefore synchronous with the current supplied to the induction motor, and through it to the electron relays. Without going into detail at the moment, it may be stated broadly that unbalance current from the bridge circuit is used not only for indicator 306, but also is applied to the control electrodes of the electron relays.

When the control electrodes become more negative, they prevent current flow through the tubes, and when they become more positive, they permit current flow, provided, however, that the anodes are positive. On reflection, it will be understood that only one relay or the other can be conductive at any one time, for in the other relay, when the anode is positive, the grid is more negative, and obliterates the effect of the positive plate potential, and when the grid is more positive, the anode is negative, and in neither case will current flow. The tubes are preferably so biased that the grids are at all times negative and draw no grid current. The grids thus serve merely to control the conductivity of the relays. In respect to the other relay, however, its grid and plate are made more positive or more negative together, so that the relay is conductive for half cycles, and functions as a half-wave rectifier. Although the short-circuiting of the shading coil thus caused by the electron relay is intermittent, it is adequate, and produces self-starting rotation of the motor in a direction dependent upon which of the two relays is conductive.

For simplicity, I have described the operation as though the relays are strictly non-conductive when there is no unbalance of the measuring bridge. Actually, the bias of the relays may be such that the tubes are somewhat conductive, thus permitting some flow of shading coil current, but this flow is equal in both coils, and is of no effect. I may also point out that while the anodes of the relays have been connected in series or push-pull, while the control electrodes are connected in parallel, it is possible to obtain the same character of operation by connecting the relay anodes in parallel, and the control electrodes in series or push-pull. The significant thing about the relation of the tube elements is that electrodes of one type controlling the conductivity of the relays are energized in alternation or push-pull, while electrodes of another type also controlling the conductivity of the relays, are energized in parallel.

As so far described, the circuit will compensate any unbalance of the bridge. It is necessary to provide additional means to paralyze the compensating apparatus when the bridge is abruptly unbalanced, as when work is passing through the mill. Broadly, this is done by means of a triode used as a rectifier tube supplied with alternating current on its plate, and normally biased beyond cut-off when there is no unbalance of the bridge. However, when the bridge is unbalanced a desired amount, the rectifier tube is made operative, and supplies current to a biasing resistor which makes the electron relays inoperative. This may be done directly on the control electrodes of the relays, but I prefer to apply the bias to a separate amplifier tube disposed between the bridge and the relays.

Referring to Fig. 13, the tube 330 is a dual tube the right-hand portion of which acts as an amplifier tube disposed between input transformer 308, and electron relays 314. The left-hand part of tube 330 acts as a rectifier tube, the anode 332 of which is supplied with alternating current through conductor 334 leading to line 326. The biasing resistor previously referred to, is indicated at 336.

The unbalance voltage of the bridge is fed through transformer 308 to meter 306 and to grid 338 of the amplifier part of twin triode 330. The same potential is coupled through a condenser 333 to the grid 340 of the rectifier tube. One side of power line 326 is connected to the plate 332 and the other side to cathode 342 through the resistor 336 and the bias resistor 344. The bias resistors 344 and 346 are connected to grid 340 through its return resistor 348. Normally, the bias resistors 344 and 346 are sufficient to bias the grid 340 beyond cut-off, and a portion of the same potential biases grid 338 of the amplifier tube to the maximum amplifying condition. The amplified alternating potential generated between the plate 350 and the cathode 342 is fed through a condenser 352 past grid leak 354 to the grids of relays 314.

Due to the fact that the secondaries of the transformers 316 and 318 are so connected up that one plate, say 322, is negative, while the other plate, say 320, is positive, the plate 320 conducts current when the plate 322 is non-conducting, and vice versa. The amount of current that each of these two plates conducts during the half cycle when it is conducting, is determined by the alternating current potential on the grids. That is, if the instantaneous alternating current potential on the grids is negative when the plate 320 conducts, that plate will conduct less current than the plate 322 which conducts during the next half-cycle when the grids are positive. The proper steady or direct current for the best operation of these grids is generated by the bias resistor 356. If the plate 320 conducts more than the plate 322, the shading coil 310 will have more of a load across it than the shading coil 312, and, of course, the direction of the motor 304 is determined by the relative loading of the respective shading coils.

The relays 314 and the rectifier half of tube 330 operate on alternating current, but the amplifier half of tube 330 requires direct current. Since a vacuum tube is also a rectifier, the rectified direct current supplied by the relays 314 may be used to energize the amplifier tube, thus dispensing with the need for batteries or a power pack. Specifically, the relay current is fed through resistor 356, and then through a low pass filter consisting of a series choke 358 and shunt condensers 360, in order to remove the ripple that would normally be present in the rectified alternating current. This rectified potential flows through conductor 361 to resistor 362 and bias resistors 344 and 346 in series, and thence back by way of conductor 363 to the secondaries of the two transformers 316 and 318, in order to provide a return circuit for the plate potentials on the relays 314. The resistor 362 generates a steady or direct anode potential for polarizing the plate 350 of the amplifier tube, and the potential across resistor 362 is fed to the plate 350 through a plate resistor 364.

The alternating current potential on plate 350 is, of course, controlled by the amplifier grid 338. The return circuit for the grid 338 is provided through the secondary of the transformer 308, the resistor 366, and the resistor 336, back to the junction between bias resistors 344 and 346. Normally, the potential drop across the bias resistor 344 is used to provide the bias potential for the grid 338, and this is selected to operate the amplifier tube at its best amplifying characteristic.

However, if the signal from the magnetic micrometer, that is, if the bridge unbalance becomes large suddenly (and in a positive direction), the bias on grid 340 of the rectifier tube enables the plate 332 to conduct current during small portions of the alternating current cycles. This current flows through the resistor 336 and causes a potential drop across it. The resistor 366 serves with condensers 368 and 370 as a low pass filter. The potential drop across resistor 366 is reflected back to grid 340 through the filter system consisting of resistor 366 and condensers 368 and 370, and thence to the secondary of the transformer 308, back to the grid 338 of tube 330, where it serves as additional bias. It biases the grid of the amplifier tube so that no plate current flows through plate 350, that is, the amplifier is cut off, and no signal reaches the relays 314. As a result, the shading coils 310 and 312 of the motor each have an equal load, and the motor is inoperative.

When the signal from the magnetic micrometer (or the resulting bridge unbalance) is small, the amplifier and consequently the relays all are operative. The motor shifts the contact on impedance 302 in such a direction as to tend to rebalance the bridge whenever the magnetic micrometer unbalances it. For weak signals, or gradual changes, this balance is always maintained, but a sudden change in positive direction causes the motor and its control circuits, or more broadly, the compensating mechanism, to become paralyzed, and the magnitude of the sudden change is indicated by the meter 306, as it should be.

To initially establish the desired zero reference point, a switch is provided at 372 for the purpose of nullifying the paralyzing effect previously mentioned. If switch 372 is open, resistor 336 will not have any additional voltage drop, regardless of the amplitude of signal on grid 340, and therefore the bias on grid 338 will always remain such as to render the tube a good amplifier. Under these conditions, the motor, through the cycle of operation previously described, will adjust the impedance 302 until the meter 306 reads zero. The switch 372 can be momentarily opened to establish zero, and then again closed, whereafter the instrument will compensate around zero.

As a specific example of quantitative values, which may be used in the circuit of Fig. 13, the magnetic micrometer 300 is a Westinghouse micrometer, as before; the compensating impedance 302 has a value of 800 ohms; the transformer 328 for energizing the bridge is a step-down transformer delivering thirty volts; and the transformer 308 leading to the tube 330 is an impedance matching transformer having an input impedance of approximately 500 ohms, and a high output impedance suitable to be used as a grid transformer. The step-up ratio may, for example, be as little as 1 to 20, and as much as 1 to 40. The instrument 306 is a vacuum tube voltmeter. The tubes 314 and 330 are dual triodes No. 6N7. The resistance 336 is one-half megohm; the resistance 344 is 500 ohms; the resistance 346 is 5,000 ohms; resistor 348 is 1 megohm; resistor 354 is one-half megohm; resistor 356 is 500 ohms; and resistor 366 is one-half megohm. Condensers 333, 352, 368 and 370 are each one-half microfarad; and condensers 360 are each eight-microfarad electrolytic condensers. The choke 358 is an iron core choke having an inductance of 20 Henrys. The transformers 316 and 318 are high ratio transformers having a ratio of, say 40 to 1. It will be understood that these values are given by way of example, and not in limitation of the invention.

A modification of the circuit previously described is illustrated in Figs. 15 and 16. It differs in showing the use of a variable inductance or so-called "Variac" for balancing the bridge, in illustrating the use of a Wien bridge for eliminating the third harmonic, in using transformer couplings between the alternating current line and the rectifier tube, and in including a voltage regulator transformer, and in utilizing wattmeter type instruments.

The measuring impedance is a magnetic micrometer 380. An indicator of the watt-meter type is shown at 382, and a recorder at 384. A watt-meter type of instrument is desirable with alternating current because of its sensitivity. The compensating impedance is a variable inductance or "Variac" marked 386. It is operated by shaded coil induction motor 388. The parts are connected into a bridge circuit which is energized from an alternating current line 390 through a transformer 392. This is merely a step-down transformer intended to guard against over-saturation of the magnetic micrometer, with consequent production of excessive odd harmonics. If desired, a voltage regulator transformer 394 may also be used, this being connected between the line 390 and transformer 392. The indicator 382 is connected across the bridge through a transformer 396, and in series with a sensitivity adjusting resistor 398 and a phase correcting condenser 400.

The manner in which these parts are connected into bridge relation will be clear from inspection of Fig. 16 showing how the coils of magnetic micrometer 380 constitute two arms of the bridge, while the Variac 386 constitutes the other two arms of the bridge. The bridge is energized through transformer 392. The primary of transformer 396 is connected across the opposite corners of the bridge and any unbalance of the bridge is transmitted through transformer 396 to indicator 382. Resistor 398 and condenser 400 are also shown in Fig. 16, but recorder 384 has been omitted, it being merely another form of indicator.

As so far described, the peaks of rolling mill pressure would be measured without zero compensation. The connection to the compensating circuit may be made across conductors A and B (Fig. 16), that is, at opposite terminals of the transformer, particularly if a Wien bridge is not used. However, when using a Wien bridge the connection is preferably made between the terminals B and C, that is, across the condenser 400. This is done in order to obtain a shift in phase which helps compensate for the phase shift produced by the Wien bridge itself. Moreover, the condenser 400 itself helps to eliminate harmonics, particularly the higher harmonics.

Referring now to Fig. 15, the Wien bridge is generally designated 402. In one arm there is a resistor 404 and a condenser 406 connected in series, while in another arm there is a resistor 408 and a condenser 410 arranged in parallel. The other arms of the bridge comprise the condensers 412 and 414. The bridge may be made to balance at one particular frequency, at which the phase change in both the shunt and the series connected arms is forty-five degrees. This frequency is selected to be 180 cycles, corresponding to the third harmonic of the sixty-cycle supply line frequency. Because of the connections across opposite corners of the bridge, and because the bridge is balanced for the third harmonic, this harmonic does not go through to the compensating circuit. The desired sixty-cycle current does go through. The second harmonic is not important because in the present case I am concerned with harmonics generated by iron core devices, particularly the magnetic micrometer, and over-saturation of an iron core generates odd but even harmonics. The fifth harmonic is small, and in any event, is attenuated by the shunt condenser 400.

The unbalance current leaving the Wien bridge is supplied through conductor 416 and condenser 452 to grid 418 of the amplifier portion of dual tube 420. The amplified current is applied through conductor 422 and condenser 424 to the control electrodes of electron relays 426. The anodes of relays 426 are made positive in alternation through the transformers 428 and 430 connected to the shading coils of the motor 388. One relay or the other becomes conductive depending upon the phase of the bridge unbalance, that is, depending upon whether the drift of zero is negative or positive. The connections are such that the resulting movement of the motor changes compensating impedance 386 in proper direction to tend to balance the bridge. When the bridge is balanced, the motor comes to rest.

The rectifier tube which is used to make the compensating circuit inoperative during sudden changes, is located as before in the left-hand portion of dual triode 420. Alternating current from line 390 and regulator 394 is supplied through conductor 429 to transformer 432, and the anode 434 and cathode 436 are connected across the secondary of transformer 432 in such a way that the rectifier tends to build up a potential across an amplifier cut-off-bias resistor 438. The grid 440 of the rectifier tube is normally very negative, so much so that the rectifier is normally non-conductive. In other words, it is biased beyond cut-off. This bias is obtained by means of a rectifier cut-off-bias resistor 442 which makes the cathode positive in respect to the grid, which is at ground direct current potential. When, however, a sudden unbalance takes place, the grid 440 is made sufficiently less negative for the rectifier to become conductive, and a direct current potential builds up on the amplifier cut-off-bias resistor 438. This potential is filtered by the condensers 444 and 446 and resistor 448, and is applied to the grid 418 of the amplifier tube through resistor 450. To keep the grids 418 and 440 moving together in potential, they are connected together by a large condenser 452, and resistor 450 is made high in value. It has a high resistance to alternating current, and although it also has a high resistance in respect to direct current, this is of no disadvantage because the grid does not draw current. It is for this reason that the direct potential applied to resistor 450 is also applied to grid 418.

The effect of this potential is to make grid 418 negative and therefore to make the amplifier side of tube 420 non-conductive. Upon a sudden unbalance of the bridge, therefore, or upon a peak value of unbalance current, the current is not transmitted through the amplifier tube to the electron relays 426, and the latter are inoperative to start the motor. It will be understood that the rectifier cut-off-bias is comparatively small, and that the amplifier cut-off-bias is large, the former being exceeded by any signal or fast change which exceeds the "capture zone." When the rectifier bias is exceeded, it generates a large bias potential across resistor 448, which cuts off the amplifier tube against even the large or fast change, or any signal within the range of the indicator.

It should be kept in mind that the connections to grid 440 of the rectifier tube should be properly phased in respect to the direction of swing of the peaks. In other words, at this time the grid should be made more positive, and an incidental result is that even if a peak-like swing takes place in the other direction, the compensating circuit is not paralyzed and remains operative. In other words, the compensating circuit discriminates not only between a slow change and a sudden change, but also between a positive change and a negative change. This is theoretically desirable because a negative drift, even a sudden one, while unlikely to occur, should be corrected if it does occur.

If the compensation is in the wrong direction it is merely necessary to reverse the leads to the Wien bridge, or the outside leads to the shading coils of the motor.

The coupling from tube 420 to tube 426 is by means of resistor 454 acting as a plate resistor for the amplifier tube, and a condenser 424 and resistor 456 acting as a grid resistor. It is to be noted that the anode-to-cathode current through relays 426 flows down through a resistor 458, then through resistor 460 and thence through resistor 442 to ground. Resistor 458 is a biasing resistor for the electron relays 426. The drop across the resistor 460 is employed to provide anode potential for the amplifier tube. The condenser 472 filters this anode or plate supply for the amplifier. The potential drop across the resistor 442 is used to provide grid bias potential for the rectifier tube, and it is this bias obtained across resistor 442 that makes the rectifier normally non-conductive.

The resistor 442 is preferably made variable, and thereby the magnitude of bridge unbalance beyond which the compensating circuit is paralyzed, may be adjusted. Differently expressed, adjustment of the resistor 442 determines the "capture zone" within which the compensating circuits take hold and are effective, the compensating circuits being ineffective when the capture zone is exceeded.

Resistor 462 regulates the sensitivity of the meters. Condenser 464 corrects the phase of the current supplied to the meters. I refer here to the power for the field coils of the alternating current instruments, that is, the power obtained from the alternating current supply line. Resistor 466 varies the sensitivity of the recorder alone. The recorder, like the indicator, is a wattmeter type instrument. Resistor 398 regulates sensitivity in respect to the movable coils of the instruments.

The switch 468 in the shading coil circuit of motor 388 is intended to throw the motor into or out of operation. The switch 470 in the rectifier circuit corresponds to switch 372 in Fig. 13, and is normally closed. When this switch is open, and switch 468 is closed, there is no compensation, and the motor acts as a true follow-up motor for constantly tending to keep the bridge in balance. If the rolling mill plant is shut down for some time and again re-opened, the error may be so great that the apparatus cannot compensate the same, that is, the error may lie beyond the available range of compensation. In such case, the switch 470 may be opened for a brief interval of time, permitting the motor to act as a follow-up motor to establish zero, whereupon the switch 470 may again be closed, following which the apparatus will compensate about zero as a base line.

The following quantitative values were used in a specific installation. The magnetic micrometer 380 was a Westinghouse micrometer, as before. The compensating impedance 386 was a variable auto-transformer known commercially as a "Variac," operating on 110 volts and capable of delivering one ampere. The transformer 394 was a conventional voltage regulating transformer for 110 volts. The transformer 392 was a step-down transformer reducing the line voltage to 80 volts (in order not to excessively oversaturate the magnetic micrometer). The transformer 396 was a special transformer supplied by the Westinghouse Company along with the magnetic micrometer. It had a step-up ratio of approximately 4 to 1. The Wien bridge 402 was a standard bridge for 180 cycles, it having an overall impedance of approximately 100,000 ohms. The tubes 420 and 426 were dual triodes No. 6N7. The potentiometer 433 acted as a potential divider to deliver an output of 80 volts, it being one-half megohm in value. The resistor 398 was 3,000 ohms; resistor 438 was one-half megohm; resistor 442 was 5,000 ohms; resistor 443 was 500 ohms; resistors 448 and 450 were each one-half megohm; resistor 454 was 100,000 ohms; resistor 456 was one-half megohm; resistor 458 was 500 ohms; resistor 460 was 30,000 ohms; resistor 462 was 250 ohms; and resistor 466 was 150 ohms. The condenser 400 was 1.5 microfarad; the condensers 424, 444, 446, and 452 were each one-tenth microfarad; the condenser 464 was 12 microfarads; condenser 472 was eight microfarads, these condensers all being paper condensers. Transformers 428 and 430 were high ratio transformers having a step-up ratio of approximately 40 to 1. The transformer secondary 431 was merely a filament heating secondary. It will be understood that the foregoing specific values are by way of example, and not in limitation of the invention.

It is believed that the construction and operation, as well as the many advantages of my improved measuring apparatus, will be apparent from the foregoing detailed description thereof. The apparatus discriminates between a slow error and a fast change, and is thereby well adapted to correct for gradual drift of a reference line when measuring peak values. It has proved to be of great benefit in connection with strain gauges for rolling mills, and overcomes the very substantial and serious aberrations which heretofore existed, due to thermal and other influences. With my improved apparatus, the total drift or error may be very large, but is continuously corrected by increments. The apparatus does not in any way level or average the peak values, and in fact, the compensating apparatus is made inoperative and completely paralyzed each time that a peak comes on. This invention is of value not only for indicating instruments, but also for recording instruments, for the peaks are then shown in reference to a perfectly straight base line, instead of one which wanders all over the sheet.

The small value or "capture zone" within which the apparatus compensates, is readily adjustable. The invention may be employed with either direct current or alternating current circuits. If the apparatus is put out of use for some time, so that it requires a degree of correction beyond the range of the apparatus, the zero reference point is readily re-established by simply momentarily opening a switch. If desired, a reference line other than zero may be maintained, as when an indication of "screw-down" pressure is wanted.

When using alternating current circuits, a conventional magnetic micrometer may be used for the measuring instrument, and the circuits may be made in bridge form in order to be relatively independent of line voltage fluctuation. Provision may be made to eliminate harmonics due to over-saturation of the micrometer. The corrective movement of the compensating impedance may be obtained by a reversing motor, and in many cases it is convenient to use a shaded pole induction motor. The shading coils of such a motor may be controlled by either mechanical relays or electron relays. The advantage of using electron relays is that the motor comes to rest without hunting, because when it reaches nearly the correct position, the motion becomes incremental, and approaches a definite limit, there being a loss of torque and then zero torque when the balanced position is reached. The electron relay system also has the advantage of avoiding contacts which may become dirtied.

The compensating circuit is made inoperative by biasing the relays to cut-off, this preferably being done by a rectifier the plate of which is supplied with alternating current and the grid of which is normally biased to cut-off for a small signal or unbalance. However, said rectifier is conductive for a large signal or unbalance, the signal being synchronous alternating energy. When the rectifier becomes conductive, the resulting current may be fed through a separate biasing resistor which generates a main cut-off bias. I prefer to apply the main cut-off bias to an amplifier tube ahead of the electron relays, rather than to the electron relays themselves. When such an amplifier tube is used, the necessary direct current for energizing the same may be obtained by utilizing a part of the rectified current from the electron relays, thus dispensing with the need for a direct current source for the amplifier tube.

It will be apparent that while I have shown and described my invention in several preferred forms, many changes and modifications may be made in the structures and circuits disclosed, without departing from the spirit of the invention defined in the following claims.

I claim:

1. Apparatus for eliminating slow errors when measuring fast changes, said apparatus comprising a device responsive to the condition to be measured, an indicator responsive thereto, a compensating device for neutralizing the effect of the condition-responsive device on the indicator, a reversible motor for the compensating device, means responsive to slow changes of the condition-responsive device for so controlling the motor as to vary the compensating device in that direction which neutralizes the change, and means responsive to a fast change of the condition-responsive device for making the aforesaid compensating means inoperative.

2. Apparatus for eliminating small errors while measuring large changes, said apparatus comprising a measuring impedance, an indicator responsive to changes in the measuring impedance, a compensating impedance for neutralizing the change of the measuring impedance, a reversible motor for varying the compensating impedance, means responsive to small changes of the measuring impedance for so controlling the motor as to change the compensating impedance in that direction which neutralizes the change, and means responsive to a large sudden change of the measuring impedance for making the aforesaid compensating means inoperative.

3. A compensated apparatus, comprising a bridge including a measuring impedance, a compensating impedance, and an indicator responsive to unbalance of the bridge, a reversible motor for varying the compensating impedance, means responsive to slow changes of the measuring impedance for so controlling the motor as to change the compensating impedance in that direction which balances the bridge, and means responsive to a sudden change of the measuring impedance for making the aforesaid means inoperative.

4. Apparatus for eliminating small errors while measuring large changes, said apparatus comprising a bridge including a measuring impedance for unbalancing the bridge, a compensating impedance for balancing the bridge, and an indicator responsive to unbalance of the bridge, a reversible motor for varying the compensating impedance, relay means responsive to a small unbalance of the bridge for starting the motor in that direction which changes the compensating impedance to balance the bridge, and means responsive to a large unbalance of the bridge for making the aforesaid relay means inoperative to start the motor.

5. A "zero compensating" strain gauge for a rolling mill, comprising means responsive to elongation of the frame of the mill for varying a condition-responsive device, an indicator responsive thereto, a compensating device for neutralizing the effect of the condition-responsive device on the indicator, a reversible motor for the compensating device, means responsive to slow changes of the condition-responsive device caused by temperature change or warping of the mill frame or like variables for so controlling the motor as to change the compensating device in that direction which neutralizes the change, and means responsive to a sudden change of the condition-responsive device caused by passage of work through the mill for making the aforesaid compensating means inoperative.

6. A "zero compensating" strain gauge for a rolling mill, comprising means responsive to elongation of the frame of the mill for varying a measuring impedance, an indicator responsive to changes in the measuring impedance, a compensating impedance for neutralizing the change of the measuring impedance, a reversible motor for varying the compensating impedance, means responsive to small incremental changes of the measuring impedance caused by temperature change or warping of the mill frame or like variables for so controlling the motor as to change the compensating impedance in that direction which neutralizes the change, and means responsive to a large change of the measuring impedance caused by passage of work through the mill for making the aforesaid compensating means inoperative.

7. A "zero compensating" strain gauge for a rolling mill, comprising means responsive to elongation of the frame of the mill for varying a measuring impedance, a compensating impedance, means connecting said impedances into an electrical bridge circuit, an indicator responsive to unbalance of the bridge as a measure of the rolling mill strain, a reversible motor for varying the compensating impedance, means responsive to slow changes of the measuring impedance caused by temperature change or warping of the mill frame or like variables for so controlling the motor as to change the compensating impedance in that direction which balances the bridge, and means responsive to a sudden change of the measuring impedance caused by passage of work through the mill for making the aforesaid compensating means inoperative.

8. Apparatus for eliminating small errors while measuring large changes, said apparatus comprising a bridge including a measuring resistance, a compensating resistance, an indicator and two relays connected across the bridge for response to unbalance of the bridge, one of said relays being adjusted to be more sensitive than the other, a reversible motor for varying the compensating resistance, means whereby the sensitive relay so controls the motor as to change the compensating resistance to balance the bridge, the other relay being so adjusted that it is responsive to a large unbalance of the bridge, but not to a small unbalance thereof, said second relay operating to make the first relay inoperative to control the motor.

9. Apparatus for eliminating small errors while measuring large changes, said apparatus comprising a bridge including a measuring resistance for unbalancing the bridge, a compensating resistance for balancing the bridge, and an indicator and two meter relays arranged in series across the bridge for response to unbalance of the bridge as an indication of changes in the measuring resistance, a reversible motor for varying the compensating resistance, spaced opposed contacts on opposite sides of zero in one of said meter relays for starting the motor in that direction which changes the compensating resistance to balance the bridge, the other meter relay having a normally closed contact connected in the circuit of the first meter relay, said second meter relay being so adjusted that it is responsive to a large unbalance of the bridge, but not to a small unbalance thereof, said second meter relay operating to make the first meter relay inoperative to control the motor.

10. Apparatus for eliminating slow errors while measuring sudden changes, said apparatus comprising a bridge including a measuring resistance of the potentiometer type for unbalancing the bridge, a compensating resistance of the potentiometer type for balancing the bridge, the ends of said resistors being connected together and to one side of a direct current supply, a pair of fixed resistors connected together and to the other side of said direct current supply, the other ends of said fixed resistors being connected to the movable contacts of the potentiometer resistors, the inner ends of said potentiometer resistors being connected together through an indicator and two relays arranged in series, the indicator and relays being responsive to unbalance of the bridge, a reversible motor for varying the compensating resistance, spaced opposed contacts in one of said relays for starting the motor in that direction which changes the compensating resistance to balance the bridge, the other relay being so adjusted that it is responsive to sudden unbalance of the bridge, but not to slow unbalance thereof, said second relay operating to make the first relay inoperative to control the motor.

11. Apparatus for eliminating small errors while measuring large changes, said apparatus comprising a bridge including a measuring resistance of the potentiometer type for unbalancing the bridge, a compensating resistance of the potentiometer type for balancing the bridge, the ends of said resistors being connected together and to one side of a direct current supply, a pair of fixed resistors connected together and to the other side of said direct current supply, the other ends of said fixed resistors being connected to the movable contacts of the potentiometer resistors, the inner ends of said potentiometer resistors being connected together through an indicator and two meter relays arranged in series, the indicator and relays being responsive to unbalance of the bridge, a reversible motor for varying the compensating resistance, secondary relays for controlling a current supply source for said motor and for starting the motor in one direction or the other, spaced opposed contacts on opposite sides of zero in one of said meter relays for so controlling the secondary relays as to start the motor in that direction which changes the compensating resistance to balance the bridge, the other meter relay having a normally closed contact connected in the circuit of the first meter relay, said second meter relay being so adjusted that it is responsive to a large unbalance of the bridge, but not to a small unbalance thereof, said second meter relay operating to make the first meter relay inoperative to control the secondary relays.

12. Apparatus for eliminating slow errors while measuring sudden changes, said apparatus comprising a bridge including a measuring resistance of the potentiometer type for unbalancing the bridge, a compensating resistance of the potentiometer type for balancing the bridge, the ends of said resistors being connected together and to one side of a direct current supply, a pair of fixed resistors connected together and to the other side of said direct current supply, the other ends of said fixed resistors being connected to the movable contacts of the potentiometer resistors, the fixed resistors of said bridge being large compared to the measuring and compensating resistors, the inner ends of said potentiometer resistors being connected together through an indicator and two relays arranged in series, the indicator and relays being responsive to unbalance of the bridge, a reversible motor for varying the compensating resistance, spaced opposed contacts on opposite sides of zero in one of said relays for starting the motor in that direction which changes the compensating resistance to balance the bridge, the second relay being so adjusted that it is responsive to sudden unbalance of the bridge, but not to slow unbalance thereof, said second relay operating to make the first relay inoperative to control the motor.

13. Apparatus for eliminating slow errors while measuring sudden changes, said apparatus comprising an alternating current bridge including a magnetic micrometer, a compensating impedance, and an indicator connected across said bridge, a reversible motor for varying the compensating impedance, two relays connected in series across a bridge and having their common terminal connected through an impedance to one side of the bridge containing the relays, whereby a small amount of current normally flows in opposite directions through the coils of said relays when the bridge containing the relays is balanced, said relay-containing bridge being unbalanced in response to the changes in the magnetic micrometer prior to compensation of the same, the contacts of said relays being arranged to control the motor, the arrangement being such that a slow unbalance of the relay-containing bridge further energizes one relay and deenergizes the other, thereby starting the motor in that direction which changes the compensating impedance to balance the bridge containing said compensating impedance, whereas a sudden unbalance of the bridge containing the relays further energizes the first relay and reenergizes the second relay, so that the relays are inoperative to start the motor.

14. Apparatus for eliminating small errors while measuring large changes, said apparatus comprising a bridge including a measuring impedance, a compensating impedance, and an indicator connected across said bridge and responsive to unbalance of the bridge, a reversible motor for varying the compensating impedance, two non-polarized relays connected in series across a bridge and having their common terminal connected through an impedance to one side of the bridge containing the relays, whereby a small amount of current normally flows in opposite directions through the coils of said relays when the bridge containing the relays is balanced, said relay-containing bridge being unbalanced in response to changes in the measuring impedance prior to compensation of the same, the contacts of said relays being arranged to control the motor, the arrangement being such that a small unbalance of the relay-containing bridge further energizes one relay and deenergizes the other, thereby starting the motor in that direction which changes the compensating impedance to balance the bridge containing said compensating impedance, whereas a large unbalance of the bridge containing the relays further energizes the first relay and reenergizes the second relay, so that the relays are inoperative to start the motor.

15. Apparatus for eliminating slow errors while measuring sudden changes, said apparatus comprising an alternating current bridge two arms of which include the coils of a magnetic micrometer, and the other two arms of which include a compensating impedance connected as a potentiometer, and an indicator connected across said bridge and responsive to unbalance of the bridge, a reversible motor for varying the compensating impedance, two non-polarized relays connected in series across a bridge and having their common terminal connected through a resistor to one side of the bridge containing the relays, whereby a small amount of current normally flows in opposite directions through the coils of said relays when the bridge containing the relays is balanced, said relay-containing bridge being unbalanced in response to changes in the magnetic micrometer prior to compensation of the same, the contacts of said relays being arranged to control the motor, the arrangement being such that a slow unbalance of the relay-containing bridge further energizes one relay and deenergizes the other, thereby starting the motor in that direction which changes the compensating impedance to balance the bridge containing said compensating impedance, whereas a sudden unbalance of the bridge containing the relays further energizes the first relay and reenergizes the second relay, so that the relays are inoperative to start the motor, and the compensating impedance is unchanged, and a correct indication of the sudden change is obtained at the indicator.

16. Apparatus for eliminating small errors while measuring large changes, said apparatus comprising a first alternating current bridge including a measuring impedance, two fixed tapped impedances, and a compensating impedance, an indicator connected across the bridge and responsive to unbalance of the same, a reversible motor for varying the compensating impedance, a second alternating current bridge having electron emission tubes in two arms thereof, the grids of said tubes being connected to the taps on the aforesaid fixed impedances, impedances in the other two arms of the second bridge, two non-polarized relays connected in series across the second bridge and having their common terminal connected through an impedance to one side of the second bridge, whereby a small amount of current normally flows in opposite directions through the coils of said relays when the second bridge is balanced, the contacts of said relays being arranged to control the motor, the arrangement being such that a small unbalance of the first bridge similarly unbalances the second bridge and further energizes one relay and deenergizes the other, thereby starting the motor in that direction which changes the compensating impedance to balance the first bridge, whereas a large unbalance of the first bridge causes a large unbalance of the second bridge and further energizes the first relay and reenergizes the second relay, so that the relays are inoperative to start the motor.

17. Apparatus for eliminating slow errors while measuring sudden changes, said apparatus comprising a first alternating current bridge two arms of which include the coils of a magnetic micrometer, and the other two arms of which include fixed tapped impedances and a compensating impedance connected therebetween in potentiometer fashion, an indicator connected across the bridge and responsive to unbalance of the same, a reversible motor for varying the compensating impedance, a second alternating current bridge having electron emission tubes in two arms of said bridge, the grids of said tubes being connected to the taps on the aforesaid fixed impedances, impedances in the other two arms of the second bridge, two non-polarized relays connected in series across the second bridge and having their common terminal connected through an impedance to one side of the second bridge, whereby a small amount of current normally flows in opposite directions through the coils of said relays when the second bridge is balanced, the contacts of said relays being arranged to control the motor, the arrangement being such that a slow unbalance of the first bridge similarly unbalances the second bridge and further energizes one relay and deenergizes the other, thereby starting the motor in that direction which changes the compensating impedance to balance the first bridge, whereas a sudden unbalance of the first bridge causes a similar unbalance of the second bridge and further energizes the first relay and reenergizes the second relay, so that the relays are inoperative to start the motor.

18. Apparatus for eliminating slow errors while measuring sudden changes, said apparatus comprising an alternating current bridge including a measuring impedance, a compensating impedance, and an indicator responsive to unbalance of the bridge, a reversible motor for varying the compensating impedance, electron relays arranged to control the motor, the anodes of said relays being connected in push-pull to an alternating current source also used for the bridge, and the control electrodes of said relays being connected in parallel and coupled to the aforesaid bridge, whereby unbalance of the bridge in one direction makes one relay conductive, and unbalance in opposite direction makes the other relay conductive, thereby starting the motor in that direction which changes the compensating impedance to balance the bridge, and means responsive to a sudden unbalance of the bridge to make the aforesaid electron relays inoperative to start the motor.

19. Apparatus for eliminating small errors while measuring large changes, said apparatus comprising an alternating current bridge including a device responsive to the condition to be measured, a compensating impedance, and an indicator responsive to unbalance of the bridge, a reversible motor for varying the compensating impedance, electron relays arranged to control the starting of the motor, the anodes of said relays being connected in push-pull to an alternating current source also used for the bridge, and the control electrodes of said relays being connected in parallel, and to the aforesaid bridge, whereby unbalance of the bridge in one direction makes one relay conductive, and unbalance in opposite direction makes the other relay conductive, thereby starting the motor in that direction which changes the compensating impedance to balance the bridge, a rectifier tube, a cut-off bias resistor for building up a cut-off bias potential for making the relays inoperative to control the motor when said rectifier is conductive, means connected to the aforesaid bridge and normally making the rectifier non-conductive, the parts being so arranged that a large unbalance of the bridge makes the rectifier conductive.

20. Apparatus for eliminating small errors while measuring large changes, said apparatus comprising an alternating current bridge including a measuring impedance, a compensating impedance, and an indicator responsive to unbalance of the bridge, a reversible motor for varying the compensating impedance, electron relays arranged to control the motor, the anodes of said relays being connected in push-pull to an alternating current source also used for the bridge, and the control electrodes of said relays being connected in parallel, an amplifier tube connected to said control electrodes, the grid of said amplifier tube being coupled to the aforesaid bridge, whereby unbalance of the bridge in one direction makes one relay conductive, and unbalance in opposite direction makes the other relay conductive, thereby starting the motor in that direction which changes the compensating impedance to balance the bridge, a rectifier, a cut-off bias resistor for building up a cut-off bias potential when said rectifier is conductive, means connecting the aforesaid cut-off bias resistor to the grid of the amplifier tube, and means whereby a large unbalance of the bridge makes the rectifier conductive and generates a cut-off bias potential which makes the amplifier tube non-conductive and thereby makes the aforesaid electron relays inoperative to start the motor.

21. Apparatus for eliminating slow errors while measuring sudden changes, said apparatus comprising an alternating current bridge two arms of which include the coils of a magnetic micrometer, and the opposite arms of which include a compensating impedance arranged as a potentiometer, an indicator responsive to unbalance of the bridge, a reversible motor for varying the compensating impedance, electron relays arranged to control the motor, the anodes of said relays being connected in push-pull to an alternating current source also used for the bridge, and the control electrodes of said relays being connected in parallel, an amplifier tube connected to said control electrodes, the grid of said amplifier tube being coupled to the aforesaid bridge, whereby unbalance of the bridge in one direction makes one relay conductive, and unbalance in opposite direction makes the other relay conductive, thereby starting the motor in that direction which changes the compensating impedance to balance the bridge, a three-electrode rectifier tube connected across an alternating current source, a cut-off bias resistor in said tube circuit for building up a cut-off bias potential when said tube is conductive, the grid of said rectifier tube being connected to the aforesaid bridge and normally making the rectifier tube non-conductive, means connecting the aforesaid cut-off bias resistor to the grid of the amplifier tube, the parts being so arranged that a sudden unbalance of the bridge makes the rectifier tube conductive and generates a cut-off bias potential which makes the amplifier tube non-conductive and thereby makes the aforesaid electron relays inoperative to start the motor.

22. Apparatus for eliminating slow errors while measuring sudden changes, said apparatus comprising an alternating current bridge including a measuring impedance, a compensating impedance, and an indicator responsive to unbalance of the bridge, a shaded pole reversible induction motor for varying the compensating impedance, the shading coils of said motor being coupled to the anodes of oppositely poled electron relays, whereby the relays tend to become conductive in alternation, the main field of said induction motor being connected to the alternating current source which is also used to energize the bridge, the control electrodes of said relays being connected in parallel so as to tend to make the relays simultaneously more or less conductive, means coupling the control electrodes to the aforesaid bridge, whereby unbalance of the bridge in one direction makes one relay conductive, and unbalance in the opposite direction makes the other relay conductive, thereby starting the motor in that direction which changes the compensating impedance to balance the bridge, and means responsive to a sudden unbalance of the bridge to make the aforesaid electron relays inoperative to start the motor.

23. Apparatus for eliminating small errors while measuring large changes, said apparatus comprising an alternating current bridge including a measuring impedance, a compensating impedance, and an indicator responsive to unbalance of the bridge, a shaded pole reversible induction motor for varying the compensating impedance, the shading coils of said motor being coupled through high ratio transformers to the anodes of oppositely poled electron relays, whereby the relays tend to become conductive in alternation, the main field of said induction motor being connected to the alternating current source which is also used to energize the bridge, the control electrodes of said relays being connected in parallel so as to tend to make the relays simultaneously more or less conductive, means including a Wien bridge for coupling the control electrodes to the aforesaid measuring bridge, whereby unbalance of the measuring bridge in one direction makes one relay conductive, and unbalance in the opposite direction makes the other relay conductive, thereby starting the motor in that direction which changes the compensating impedance to balance the measuring bridge, and means responsive to a large unbalance of the bridge to make the aforesaid electron relays inoperative to start the motor.

24. Apparatus for eliminating slow errors while measuring sudden changes, said apparatus comprising an alternating current bridge including a measuring impedance, a compensating impedance, and an indicator responsive to unbalance of the bridge, a shaded pole reversible induction motor for varying the compensating impedance, the shading coils of said motor being coupled to the anodes of oppositely poled electron relays, whereby the relays tend to become conductive in alternation, the main field of said induction motor being connected to the alternating current source which is also used for the bridge, the control electrodes of said relays being connected in parallel so as to tend to make the relays simultaneously more or less conductive, means including an amplifier tube for coupling the control electrodes to the aforesaid bridge, whereby unbalance of the bridge in one direction makes one relay conductive, and unbalance in the opposite direction makes the other relay conductive, thereby starting the motor in that direction which changes the compensating impedance to balance the bridge, a rectifier, a cut-off bias resistor for building up a cut-off bias potential for the amplifier tube when the rectifier is conductive, and means whereby a sudden unbalance of the bridge makes the rectifier conductive and thereby generates a cut-off bias potential which makes the relays inoperative to start the motor.

25. Apparatus for eliminating small errors while measuring large changes, said apparatus comprising a first alternating current bridge including a measuring impedance, two fixed tapped impedances, and a compensating impedance, an indicator connected across the bridge and responsive to unbalance of the same, a reversible motor for varying the compensating impedance, a second alternating current bridge having electron emission tubes in two arms thereof, the grids of said tubes being connected to the taps on the aforesaid fixed impedances, impedances in the other two arms of the second bridge, two non-polarized relays connected in series across the second bridge and having their common terminal connected through an impedance to one side of the second bridge, whereby a small amount of current normally flows in opposite directions through the coils of said relays when the second bridge is balanced, the contacts of said relays being arranged to control the motor, the arrangement being such that a small unbalance of the first bridge similarly unbalances the second bridge and further energizes one relay and de-energizes the other, thereby starting the motor in that direction which changes the compensating impedance to balance the first bridge, whereas a large unbalance of the first bridge causes a large unbalance of the second bridge and further energizes the first relay and reenergizes the second relay, so that the relays are inoperative to start the motor, and means to simultaneously oppositely move the taps on the two fixed impedances in order to shift the reference line relative to which the errors are compensated.

26. Apparatus for eliminating slow errors when measuring fast changes, said apparatus comprising a device responsive to the condition to be measured, an indicator responsive thereto, a compensating device for neutralizing the effect of the condition-responsive device on the indicator, means for actuating the compensating device, means responsive to slow changes of the condition-responsive device for causing the actuating means to vary the compensating device in that direction which neutralizes the change, and means responsive to a fast change of the condition-responsive device for making the actuating means inoperative to vary the compensating device.

27. A "zero compensating" strain gauge for a rolling mill, comprising means responsive to elongation of the frame of the mill for varying a condition-responsive device, an indicator responsive thereto, a compensating device for neutralizing the effect of the condition-responsive device on the indicator, means for actuating the compensating device, means responsive to slow changes of the condition-responsive device caused by temperature change or warping of the mill frame or like variables for causing the actuating means to vary the compensating device in that direction which neutralizes the change, and means responsive to a sudden change of the condition-responsive device caused by passage of work through the mill for making the actuating means inoperative to vary the compensating device.

28. Apparatus including an indicator having a relatively movable pointer and scale, said scale including a reference point whereby said pointer may indicate a quantity relative to said reference point, and means for eliminating slow errors in the location of the pointer relative to the reference point when measuring fast changes, said means comprising a device responsive to the condition to be measured, said indicator being responsive to said condition-responsive device, a compensating device for maintaining the desired relation of the pointer to the aforesaid reference point by neutralizing the effect of the condition-responsive device on the indicator, means for actuating the compensating device, means responsive to slow changes of the condition-responsive device for causing the actuating means to vary the compensating device in that direction which neutralizes the change, means responsive to a fast change of the condition-responsive device for making the actuating means inoperative to vary the compensating device, and additional means to vary that quantitative value which is represented by the reference point and about which or relative to which the compensating device functions.

29. Apparatus for eliminating slow errors while measuring sudden changes, said apparatus comprising an alternating current bridge including a magnetic micrometer, a compensating impedance, and an indicator connected across said bridge, a reversible motor for varying the compensating impedance, two relays connected in series with each other and having their outer terminals subjected to a difference in potential corresponding to that across the bridge and having their common terminal connected through an impedance to a potential point corresponding to that at one side of the bridge, whereby a small amount of current normally flows in opposite directions through the coils of said relays when the bridge is balanced, the contacts of said relays being arranged to control the motor, the arrangement being such that a slow unbalance of the bridge changes the potentials across the relays and further energizes one relay and deenergizes the other, thereby starting the motor in that direction which changes the compensating impedance to balance the bridge, whereas a sudden unbalance of the bridge further energizes the first relay and reenergizes the second relay, so that the relays are inoperative to start the motor.

SAMUEL J. A. M. BAGNO.